(12) United States Patent
Masatsugu et al.

(10) Patent No.: US 8,112,558 B2
(45) Date of Patent: Feb. 7, 2012

(54) FRAME BUFFER MANAGEMENT PROGRAM, PROGRAM STORAGE MEDIUM AND MANAGEMENT METHOD

(75) Inventors: Hiroyuki Masatsugu, Kawasaki (JP); Makiko Konoshima, Kawasaki (JP); Yuichiro Teshigahara, Kawasaki (JP); Tomonori Kubota, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1585 days.

(21) Appl. No.: 11/343,182

(22) Filed: Jan. 31, 2006

(65) Prior Publication Data
US 2007/0097258 A1 May 3, 2007

(30) Foreign Application Priority Data
Oct. 28, 2005 (JP) ................................. 2005-315081

(51) Int. Cl.
*G06F 3/00* (2006.01)
(52) U.S. Cl. .................. 710/20; 710/7; 710/33; 710/52; 370/413; 725/94; 345/543; 345/574
(58) Field of Classification Search ............ 725/86–100; 345/543–545, 530, 564–574; 375/240, 240.01; 710/1, 5, 7, 20, 33, 52, 100, 305, 306, 310; 370/351, 389, 412, 413
See application file for complete search history.

(56) References Cited

U.S. PATENT DOCUMENTS

| | | | | |
|---|---|---|---|---|
| 4,991,169 A | * | 2/1991 | Davis et al. .................... | 370/463 |
| 5,442,390 A | * | 8/1995 | Hooper et al. .................. | 725/90 |
| 5,742,797 A | | 4/1998 | Celi, Jr. et al. | |
| 5,986,707 A | * | 11/1999 | Geshwind ................. | 375/240.01 |
| 7,139,868 B2 | * | 11/2006 | Parry et al. .................... | 711/110 |
| 7,263,280 B2 | * | 8/2007 | Bullock et al. ................. | 386/241 |
| 7,730,238 B1 | * | 6/2010 | Arulambalam et al. ........ | 710/52 |
| 7,739,421 B1 | * | 6/2010 | Arulambalam et al. ........ | 710/20 |
| 7,913,282 B2 | * | 3/2011 | Ishikawa et al. ................ | 725/87 |
| 2008/0098323 A1 | * | 4/2008 | Vallone et al. ................ | 715/772 |

FOREIGN PATENT DOCUMENTS

| | | |
|---|---|---|
| JP | 3-44747 | 2/1991 |
| JP | 3-154973 | 7/1991 |
| JP | 4-191942 | 7/1992 |
| JP | 9-62235 | 3/1997 |
| JP | 9-128214 | 5/1997 |
| JP | 2003-58135 | 2/2003 |

OTHER PUBLICATIONS

Notice of Grounds Rejection for Japanese Application No. 2005-315081; mailed Sep. 6, 2011.

* cited by examiner

*Primary Examiner* — David C. Payne
*Assistant Examiner* — James M Perez
(74) *Attorney, Agent, or Firm* — Staas & Halsey LLP

(57) ABSTRACT

This is a computer-readable portable storage medium which is used by a computer managing a plurality of frame buffers and which stores a program enabling the computer to execute a process, and the process comprises preparing an area in which data of a valid chain indicating a connection among frame buffers storing valid image data of the plurality of frame buffers and data of a vacant chain indicating a connection among frame buffers storing no valid image data, is stored, on memory and generating/updating data of the valid chain and the vacant chain when valid image data is stored in one of the plurality of frame buffers and storing it in the memory.

7 Claims, 15 Drawing Sheets

| | | INITIAL STATUS | ONE-FRAME REGISTRATION | TWO-FRAME REGISTRATION | THREE-FRAME REGISTRATION | NINE-FRAME REGISTRATION | TEN-FRAME REGISTRATION |
|---|---|---|---|---|---|---|---|
| BLOCK #0 | PREV (BLOCK No. STORING A PREVIOUS FRAME) | 9 | 0 | 1 | 2 | 2 | 2 |
| | NEXT (BLOCK No. STORING A SUBSEQUENT FRAME) | 1 | 0 | 1 | 1 | 1 | 1 |
| | STATUS OF A BLOCK | UNUSED | USED | USED | USED | USED | USED |
| | FRAME DATA | | | | | | |
| | TIME INFORMATION OF FRAME DATA | | | | | | |
| BLOCK #1 | PREV (BLOCK No. STORING A PREVIOUS FRAME) | 0 | 9 | 0 | 0 | 0 | 0 |
| | NEXT (BLOCK No. STORING A SUBSEQUENT FRAME) | 2 | 2 | 0 | 2 | 2 | 2 |
| | STATUS OF A BLOCK | UNUSED | UNUSED | USED | USED | USED | USED |
| BLOCK #2 | FRAME DATA | | | | | | |
| | TIME INFORMATION OF FRAME DATA | | | | | | |
| BLOCK #3 | PREV (BLOCK No. STORING A PREVIOUS FRAME) | 1 | 1 | 9 | 1 | 1 | 1 |
| | NEXT (BLOCK No. STORING A SUBSEQUENT FRAME) | 3 | 3 | 3 | 0 | 0 | 3 |
| | STATUS OF A BLOCK | UNUSED | UNUSED | UNUSED | USED | USED | USED |
| | FRAME DATA | | | | | | |
| | TIME INFORMATION OF FRAME DATA | | | | | | |
| ⋮ | | | | | ⋮ | | ⋮ |
| BLOCK #8 | PREV (BLOCK No. STORING A PREVIOUS FRAME) | 7 | 7 | 7 | 7 | 7 | 7 |
| | NEXT (BLOCK No. STORING A SUBSEQUENT FRAME) | 9 | 9 | 9 | 9 | 0 | 9 |
| | STATUS OF A BLOCK | UNUSED | UNUSED | UNUSED | UNUSED | USED | USED |
| | FRAME DATA | | | | | | |
| | TIME INFORMATION OF FRAME DATA | | | | | | |
| BLOCK #9 | PREV (BLOCK No. STORING A PREVIOUS FRAME) | 8 | 8 | 8 | 8 | 9 | 9 |
| | NEXT (BLOCK No. STORING A SUBSEQUENT FRAME) | 0 | 1 | 2 | 3 | 9 | 0 |
| | STATUS OF A BLOCK | UNUSED | UNUSED | UNUSED | UNUSED | UNUSED | USED |
| | FRAME DATA | | | | | | |
| | TIME INFORMATION OF FRAME DATA | | | | | | |

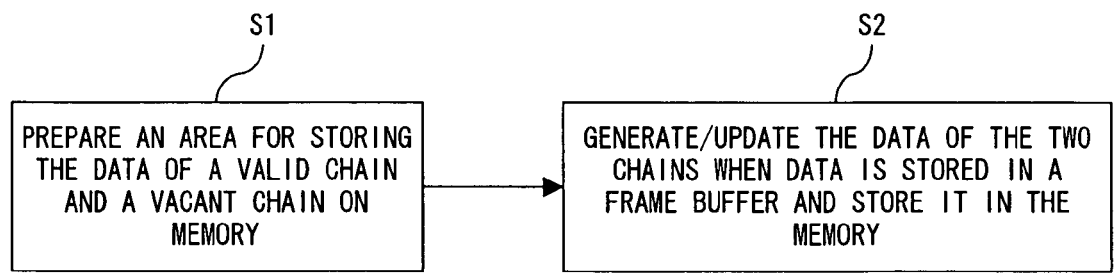
F I G. 1

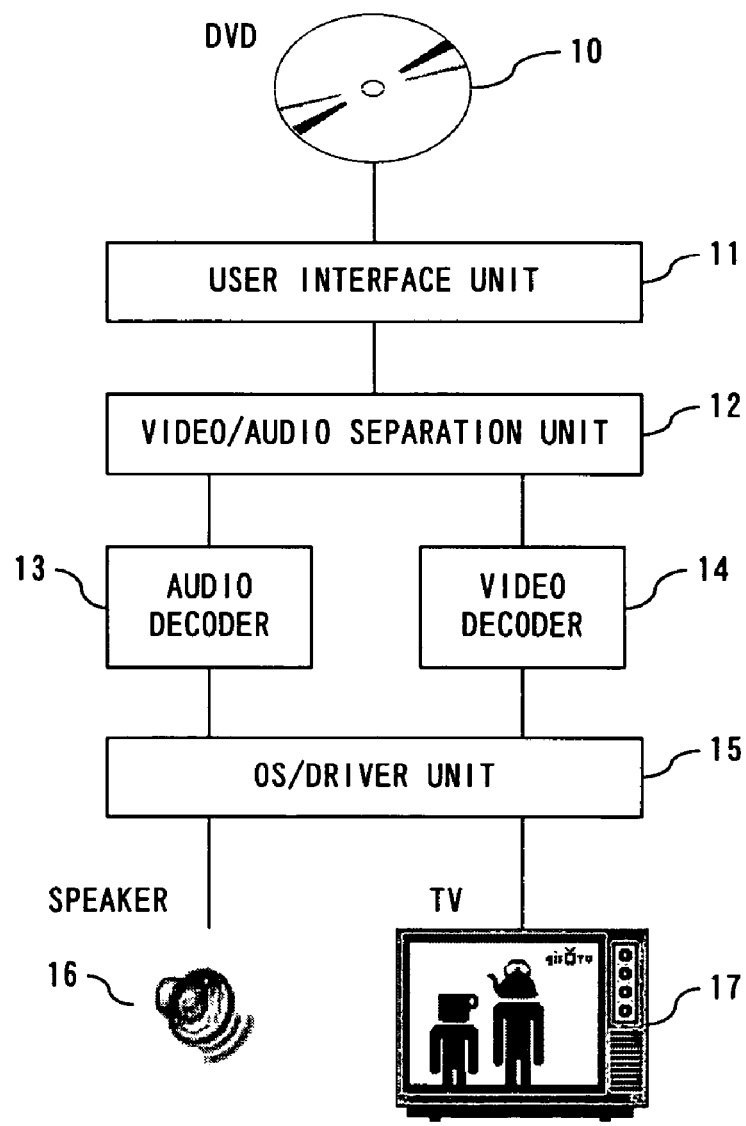
F I G. 2

VLD : VARIABLE LENGTH DECODER
IQ : INVERSE QUANTIZER UNIT
IDCT : INVERSE DISCRETE COSINE TRANSFORM UNIT
MC : MOTION COMPENSATION UNIT

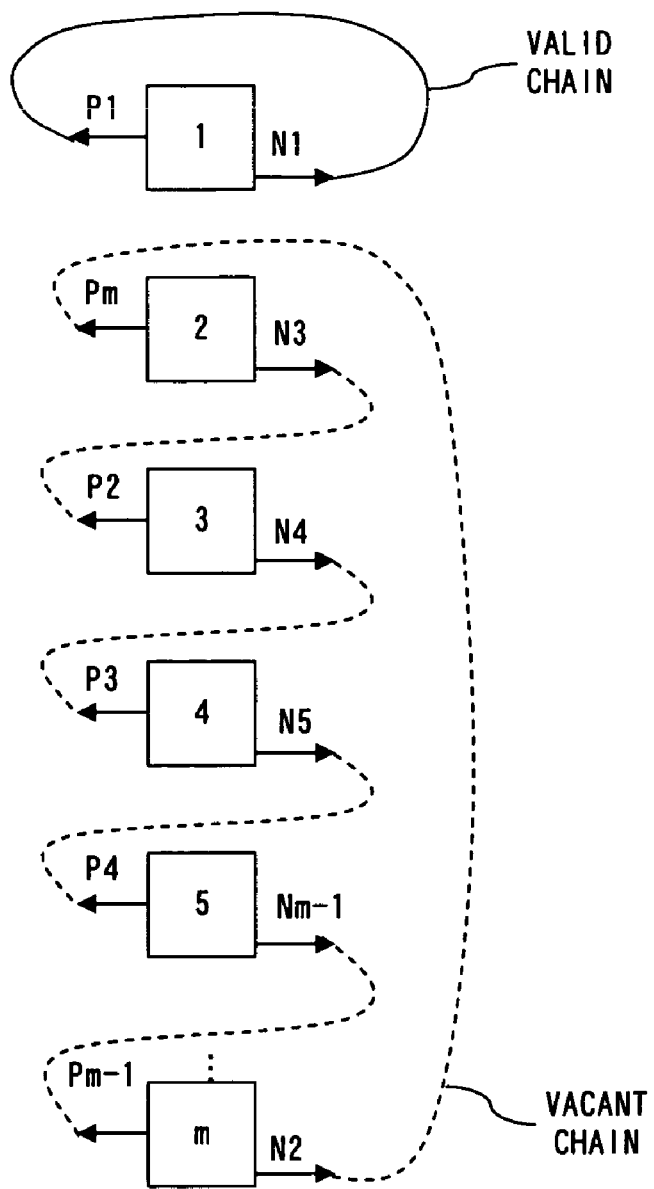
F I G. 6

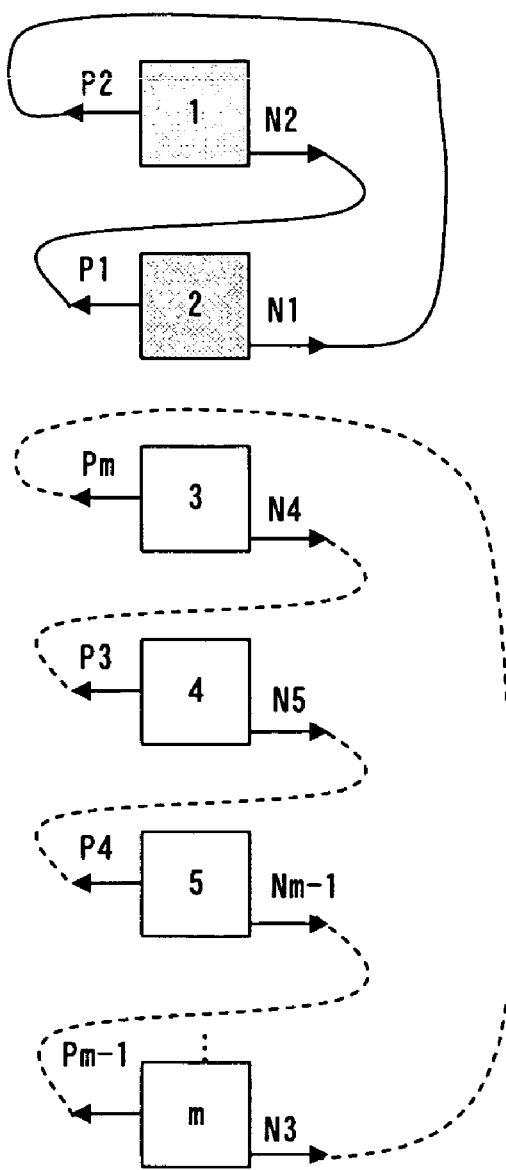
F I G. 7

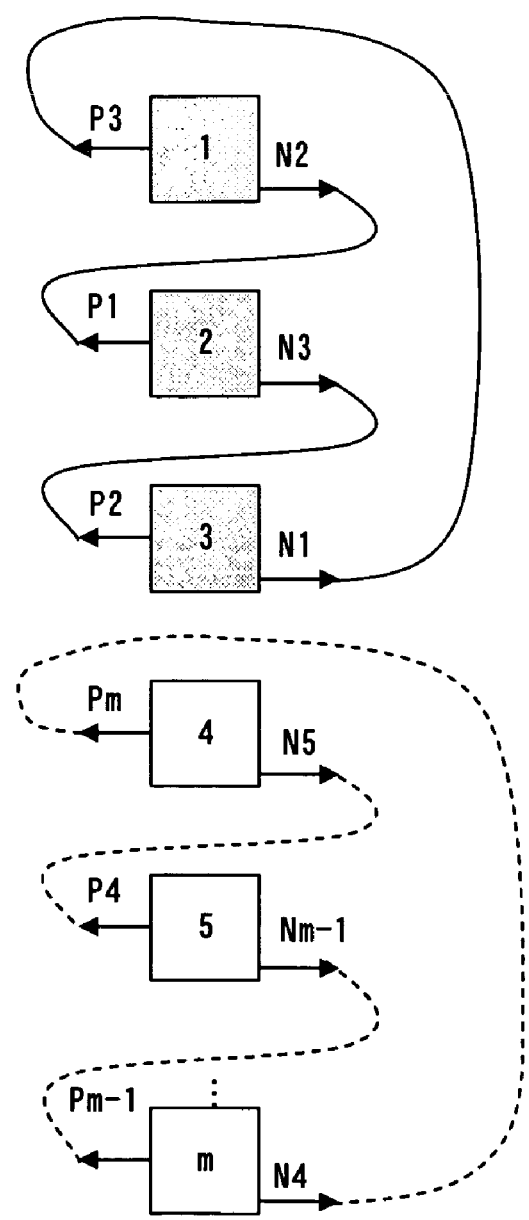
F I G. 8

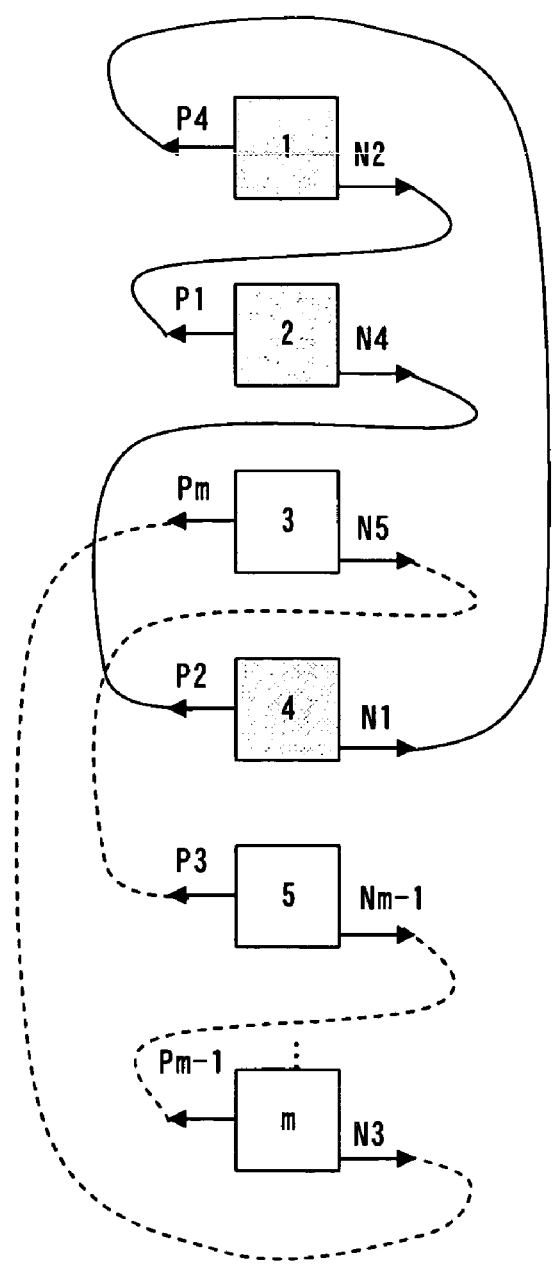
F I G. 1 0

| | INITIAL STATUS | ONE-FRAME REGISTRATION | TWO-FRAME REGISTRATION | THREE-FRAME REGISTRATION | ... | NINE-FRAME REGISTRATION | TEN-FRAME REGISTRATION |
|---|---|---|---|---|---|---|---|
| NUMBER OF THE BLOCKS OF A VALID CHAIN | 0 | 1 | 2 | 3 | | 9 | 10 |
| NUMBER OF THE BLOCKS OF A VACANT CHAIN | 10 | 9 | 8 | 7 | | 1 | 0 |
| NUMBER OF THE LEADING BLOCK OF A VALID CHAIN | 0 | 0 | 0 | 0 | | 0 | 0 |
| NUMBER OF THE LEADING BLOCK OF A VACANT CHAIN | 0 | 1 | 2 | 3 | | 9 | 9 |

| | INITIAL STATUS | ONE-FRAME REGISTRATION | TWO-FRAME REGISTRATION | THREE-FRAME REGISTRATION | ... | NINE-FRAME REGISTRATION | TEN-FRAME REGISTRATION |
|---|---|---|---|---|---|---|---|
| BLOCK #0 — PREV (BLOCK No. STORING A PREVIOUS FRAME) | 9 | 0 | 1 | 2 | | 2 | 2 |
| NEXT (BLOCK No. STORING A SUBSEQUENT FRAME) | 1 | 0 | 1 | 1 | | 1 | 1 |
| STATUS OF A BLOCK | UNUSED | USED | USED | USED | | USED | USED |
| FRAME DATA | | | | | | | |
| TIME INFORMATION OF FRAME DATA | | | | | | | |
| BLOCK #1 — PREV | 0 | 9 | 0 | 0 | | 0 | 0 |
| NEXT | 2 | 2 | 0 | 2 | | 2 | 2 |
| STATUS OF A BLOCK | UNUSED | UNUSED | USED | USED | | USED | USED |
| FRAME DATA | | | | | | | |
| TIME INFORMATION OF FRAME DATA | | | | | | | |
| BLOCK #2 — PREV | 1 | 1 | 9 | 1 | | 1 | 1 |
| NEXT | 3 | 3 | 3 | 0 | | 0 | 3 |
| STATUS OF A BLOCK | UNUSED | UNUSED | UNUSED | USED | | USED | USED |
| FRAME DATA | | | | | | | |
| TIME INFORMATION OF FRAME DATA | | | | | | | |
| BLOCK #3 — PREV | 7 | 7 | 7 | 7 | | | |
| NEXT | 9 | 9 | 9 | 9 | | | |
| STATUS OF A BLOCK | UNUSED | UNUSED | UNUSED | UNUSED | | | |
| FRAME DATA | | | | | | | |
| TIME INFORMATION OF FRAME DATA | | | | | | | |
| ... | | | | | | | |
| BLOCK #8 — PREV | 8 | 8 | 8 | 8 | | 7 | 7 |
| NEXT | 0 | 1 | 2 | 3 | | 0 | 9 |
| STATUS OF A BLOCK | UNUSED | UNUSED | UNUSED | UNUSED | | USED | USED |
| FRAME DATA | | | | | | | |
| TIME INFORMATION OF FRAME DATA | | | | | | | |
| BLOCK #9 — PREV | 8 | 8 | 8 | 8 | | 9 | 8 |
| NEXT | 0 | 1 | 2 | 3 | | 9 | 0 |
| STATUS OF A BLOCK | UNUSED | UNUSED | UNUSED | UNUSED | | UNUSED | USED |
| FRAME DATA | | | | | | | |
| TIME INFORMATION OF FRAME DATA | | | | | | | |

FRAME BUFFER MANAGEMENT PROGRAM, PROGRAM STORAGE MEDIUM AND MANAGEMENT METHOD

CROSS-REFERENCE TO RELATED APPLICATIONS

This application is based upon and claims the benefit of priority from the prior Japanese Patent Application No. 2005-315081 filed on Oct. 28, 2005, the entire contents of which are incorporated herein by reference.

BACKGROUND OF THE INVENTION

1. Field of the Invention

The present invention relates to a method for managing a plurality of frame buffers storing moving image data, and more particularly to a method for managing a plurality of frame buffers storing replayed image data obtained by a decoding process in the decoding system of moving image data compressed and encoded according to a variety of standards, such as MPEG and the like.

2. Description of the Related Art

As a standard specification concerning moving image compression and encoding, a variety of standards such as H.261 corresponding to ISDN moving image transfer, H.262 corresponding to broadcast media moving images, H.263 corresponding to the existing telephone network television telephone, MPGE-1 corresponding to storage media moving images, MPEG-2 as the same standard as H.262, MPEG-4 corresponding to multimedia, such as computer, communication, broadcasting, home appliance, etc. are used. In a system for decoding stream data encoded based on such a standard, a lot of frame buffers for storing replayed image data obtained by a decoding process, and after storing the image data of each frame in a frame buffer, the image data is displayed, for example, on a display screen.

However, since the volume of moving image data is usually enormous and the number of frame buffers for storing it is limited, the vacancy of a frame buffer must be appropriately managed and image data must be stored. Conventionally, for example, a flag for indicating whether a frame buffer stores data is provided, frame buffers are all retrieved and data is stored in a vacant frame buffer. However, there are a lot of frame buffers and when a vacant frame buffer is found near the end of the retrieval, the retrieval takes a lot of time.

As the prior art of a storage area management method for memory, such as a frame buffer or the like, Patent reference 1 discloses a technology capable of solving a problem that, in the management of the working area of frame memory or the like, an area cannot be assigned, depending on a required shape even when there is space sufficient to satisfy a requirement on memory and the efficiency in use of the working area degrades.

Patent reference 2 discloses a technology in which in a method for managing a memory area in units of rectangles, a memory management table corresponding to an adjacent area is provided with a left connection pointer and an upper connection point and an area of an arbitrary size can be used.

Patent reference 1: Japanese Patent Application Publication No. H3-44747 "Memory Management Processing Method"

Patent reference 2: Japanese Patent Application Publication No. H3-154973 "Memory Management Method"

However, when a frame buffer storing valid data and a vacant frame buffer are arrayed at random, such prior arts cannot improve the retrieval speed of a frame buffer in which data is subsequently stored or whose data is replayed.

SUMMARY OF THE INVENTION

It is an object of the present invention to provide a frame buffer management program capable of searching for a frame buffer which stores subsequent data or to from which a subsequent replayed image is read in high speed even when a vacant frame buffer which stores no valid data and a frame buffer in use which stores valid data are arrayed at random in a worm-eaten state and its management method.

The program of the present invention enables a computer to execute a process of preparing an area in which the data of a valid chain indicating a connection among frame buffers storing valid image data of a plurality of frame buffers and the data of a vacant chain indicating a connection among frame buffers storing no valid image data, is stored, on memory at the first step, and generating/updating the data of the valid chain and the data of the vacant chain and storing it in the memory when valid image data is stored in one of the plurality of frame buffers in a subsequent step.

When image data stored in one of the plurality of frame buffers becomes unnecessary, the program of the present invention can further enable a computer to execute a process of releasing a frame buffer storing the data and a process of updating the data of the valid chain and the data of the vacant chain and storing it in the memory.

In the present invention, a computer-readable portable storage medium on which this frame buffer management program is recorded can also be used and a frame buffer management method for preparing an area in which the data of a valid chain and the data of a vacant chain is stored in memory according to the frame buffer management program of the present invention, and generating/updating the data of the valid chain and the data of the vacant chain and storing it in the memory when valid image data is stored can be further used.

According to the present invention, even when a vacant frame buffer and a frame buffer storing valid data are arrayed at random in a worm-eaten state, a frame buffer to store subsequent data can be searched for in high speed or image data to be subsequently replayed can be obtained in high speed in fast-forward replay and rewind replay, thereby facilitating the frame buffer management in a moving image decoding system and improving its control speed.

BRIEF DESCRIPTION OF THE DRAWINGS

FIG. 1 is the basic functional block diagram of the frame buffer management program of the present invention.

FIG. 2 shows an example of the configuration of a moving image replay system using the frame buffer management method of the present invention.

FIG. 6 explains a method for storing data in a frame buffer (No. 2).

FIG. 7 explains a method for storing data in a frame buffer (No. 3).

FIG. 8 explains a method for storing data in a frame buffer (No. 4).

FIG. 10 explains a method for deleting data from a frame buffer.

FIG. 11 shows an example of the storage of common data corresponding to each block in a valid chain and a vacant chain.

FIG. 12 shows an example of the storage of individual data corresponding to each block in a valid chain and a vacant chain.

DESCRIPTION OF THE PREFERRED EMBODIMENTS

Figure 3:
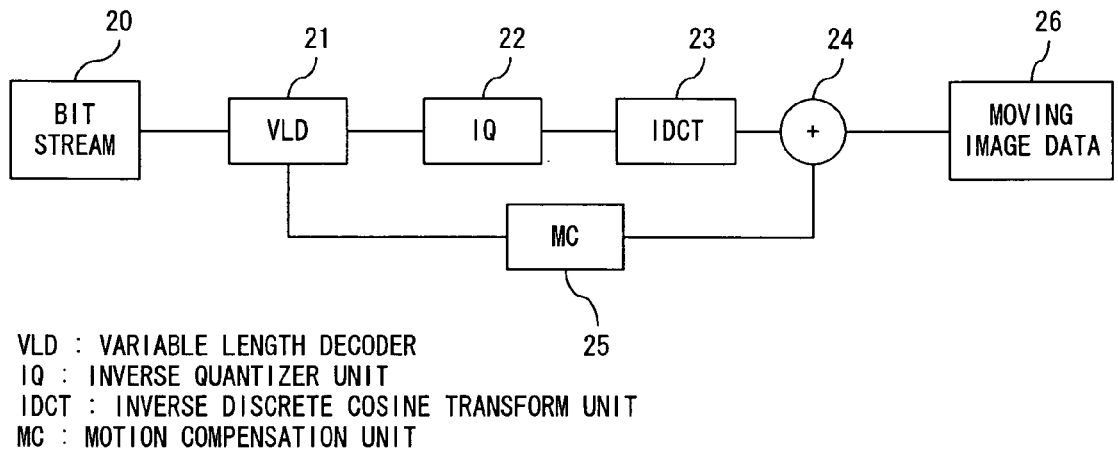
FIG. 3 shows an example of a video decoder shown in FIG. 2.

FIG. 1 is the basic functional block diagram of the frame buffer management program of the present invention. FIG. 1 is the basic functional block diagram of a program used by a computer managing a plurality of frame buffers.

In FIG. 1, firstly in step S1 of the program of the present invention, an area in which the data of a valid chain indicating a connection among frame buffers storing valid image data of a plurality of frame buffers and the data of a vacant chain indicating a connection among frame buffers storing no valid image data, is stored, is prepared on memory. In step S2, when valid image data is stored in one of the plurality of frame buffers, the data of a valid chain and the data of a vacant chain is generated/updated and are stored in the memory.

In the preferred embodiment of the present invention, when image data stored in one of the plurality of frame buffers becomes unnecessary, further a frame buffer storing the data can be released, and also the data of the valid chain and the data of the vacant chain can be updated and stored in memory.

In the preferred embodiment of the present invention, a computer-readable portable storage medium on which this frame buffer management program is recorded can also be used and a frame buffer management method for preparing an area in which the data of a valid chain and the data of a vacant chain is stored in memory according to the frame buffer management program of the present invention, and generating/updating the data of the valid chain and the data of the vacant chain and storing it in the memory when valid image data is stored can be further used.

FIG. 2 shows an example of the configuration of a moving image replay system using the frame buffer management method of the present invention. This system outputs MPEG bit stream recorded on a DVD 10 to video and audio output equipment.

The MPEG bit stream data recorded on the DVD 10 in FIG. 2 is inputted to a video/audio separation unit 12 via a user interface unit 11. The separated audio data and video data are provided to an audio decoder 13 and a video decoder 14, respectively, and the decoding results of these decoders are replayed by a speaker 16 and a TV 17, respectively, via an OS/driver unit 15.

The frame buffer management method of the present invention is relates to the management method of moving image data decoded by the video decoder 14. The internal configuration of the video decoder is described with reference to FIG. 3. In FIG. 3, variable-length decoding is applied to the data of a bit stream 20 by a VLD 21, inverse quantization is applied to the data by an IQ 22, inverse discrete cosine transform is applied to the data by an IQ 22, inverse discrete cosine transform is an adder 24. Motion compensation is applied to the output of the VLD 21 by a MC 25, the compensated result is added to the output of the IDCT 23 by the adder 24 and is outputted as moving image data 26.

Figure 4:
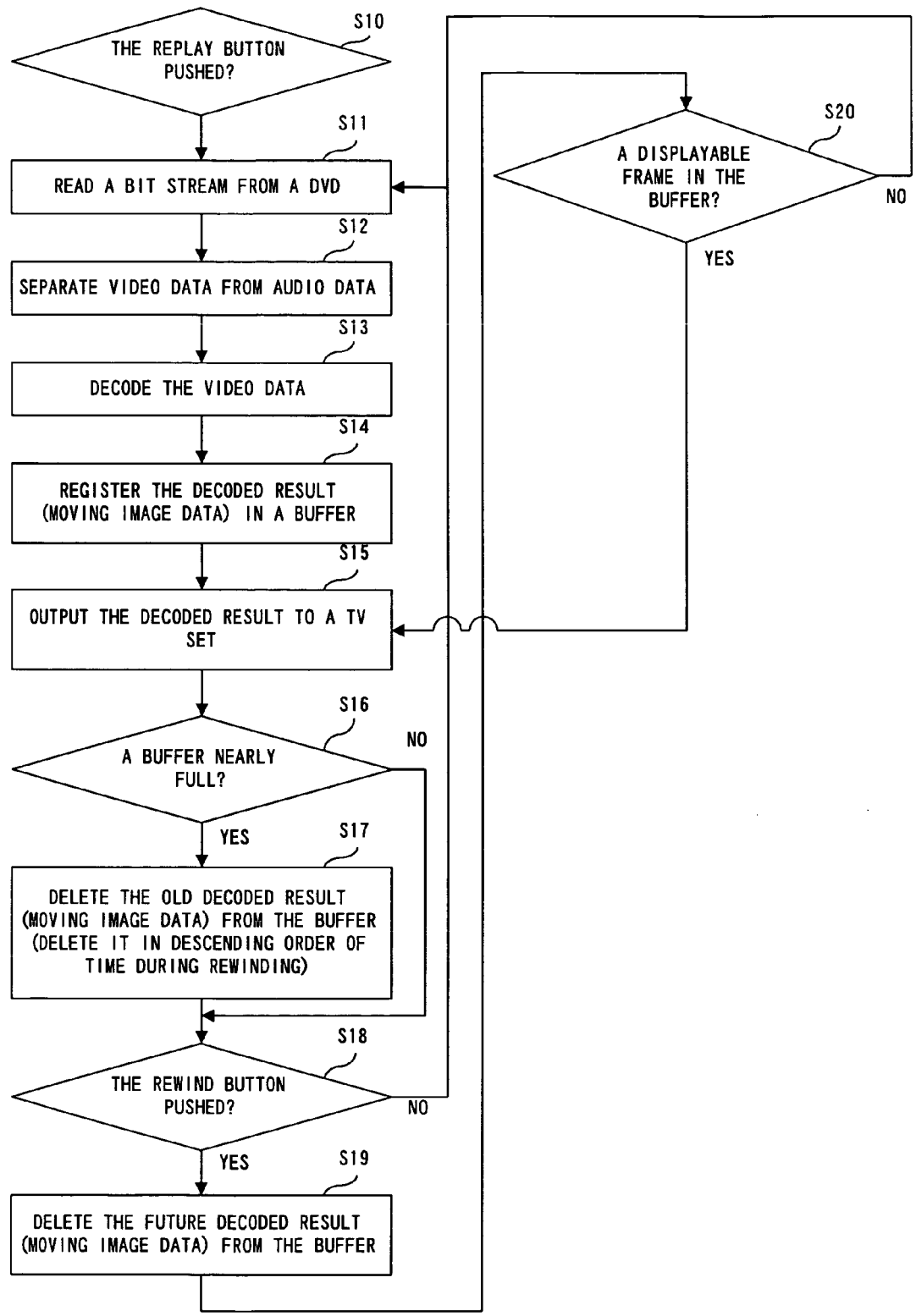
FIG. 4 is a flowchart showing the entire moving image replay process of the system shown in FIG. 2.

FIG. 4 is a flowchart showing the entire moving image replay process of the system shown in FIG. 2. A process in the case where a replay button is pushed in FIG. 4 and there is a possibility that rewind button may be pushed in the middle of video data repay is described below.

Firstly, in step S10, when it is determined that the replay button is pushed, in step S11 bit stream data is read from the DVD 10. Then, in step S12, the video/audio separation unit 12 separates video data from audio data. Then, in step S13, the video decoder 14 decodes the video data. Then, in step S14, moving image data as a decoded result is registered (stored) in a frame buffer. Then, in step S15, the decoded result is outputted to the TV 17. The detailed process of registration of the valid chain after storing the decoded result in a frame buffer in step S14, that is, the process in step S2 of FIG. 1 will be described later. Furthermore, it is assumed that the process in step S1 of FIG. 1 is performed as the initialization process of the system prior to the process shown in FIG. 4.

Then, in step S16 it is determined whether a buffer is nearly full, specifically, whether moving image data as a decoded result is stored in most of the plurality of frame buffers. If the buffer is nearly full, in step S17 the process proceeds to a process in step S18 after the old decoded result (moving image data) is deleted from the frame buffer. If the buffer is not nearly full, immediately the process proceeds to a process in step S18. In this case, although moving image data as a decoded result is deleted in ascending order of time, it is assumed that in rewinding, which will be described later, is deleted in descending order of time.

In step S18 it is determined whether a rewind button is pushed. If the rewind button is not pushed, the processes in steps S11 and after are continued and data replay is continued. If it is determined that the rewind button is pushed, in step S19 moving image data as a decoded result to be replayed in the future is deleted from the frame buffer.

Specifically, generally a bit stream is read prior to the output of a decoded result during replay, the data read prior to the output is decoded and is stored in advance in a frame buffer. However, when the rewind button is pushed, such data is deleted from a buffer as unnecessary one. The update process of a valid chain or the like in the case where data is deleted from a frame buffer, including the data deletion in step S17, will also be described later.

After the future decoded result is deleted in step S19, in step S20 it is determined whether there is a displayable frame in a frame buffer, that is, valid data. If there is such data, the processes in steps S15 and after are repeated. If there is no such data, the processes in steps S11 and after are repeated. In order to keep displaying data when there is no valid data while the rewind button is pushed, the processes in steps S11 and after are repeated.

Next, the basic operation of the frame buffer management method of this preferred embodiment is described with reference with FIGS. 5-10. In this example, the frame buffer management method is described assuming that m frame buffers, 1-*m* exist.

Figure 5:
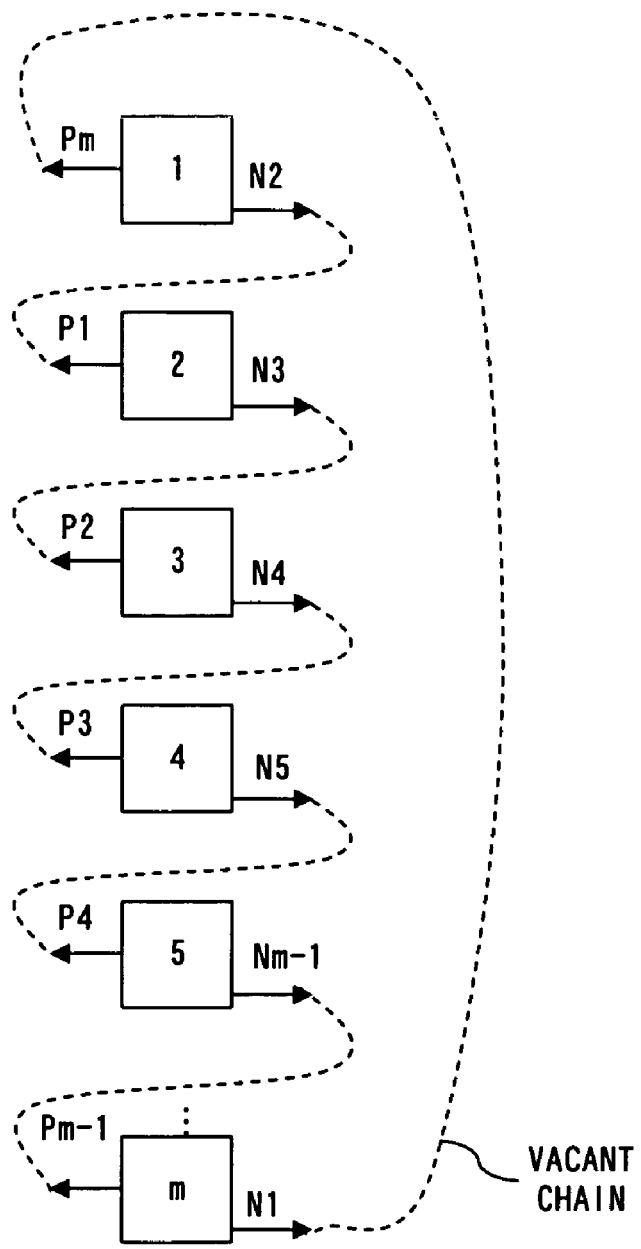
FIG. 5 explains a method for storing data in a frame buffer (No. 1).

FIG. 5 shows an initial status. In this initial status, m frame buffers are vacant, that is, unused, and these frame buffers are connected by a vacant chain indicating the data storage order of frame buffers storing no decoded results. This vacant chain is represented by a dotted line, and, for example, variables N2 indicating one after frame buffer 1 and N3 indicating one after frame buffer 2 indicate frame buffers 2 and 3, respectively.

In FIG. 6, decoded data is stored in frame buffer 1 in the status shown in FIG. 5. In this status, a vacant chain indicated by a dotted line connects frame buffers 2-*m*, while only frame buffer 1 is connected to a valid chain indicated by a solid line for frame buffers storing decoded results. A variable N1 indicating one after frame buffer 1 indicates the frame buffer itself.

In FIG. 7, data is stored in frame buffer 2. In this case, frame buffers 1 and 2 are connected by a valid chain, while frame buffers 3-*m* are connected by a vacant chain.

Figure 9:
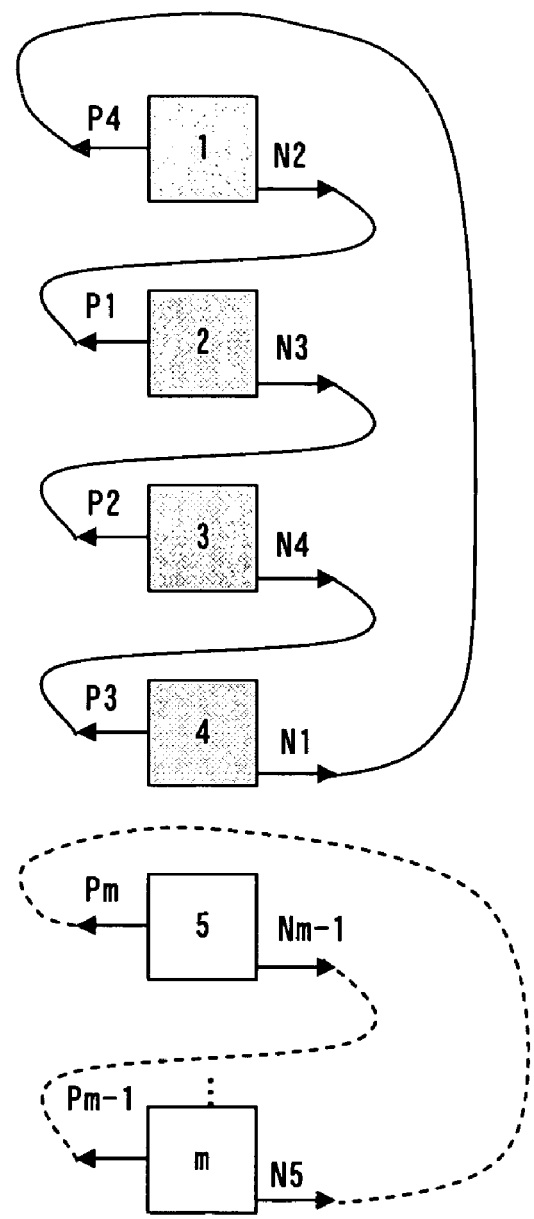
FIG. 9 explains a method for storing data in a frame buffer (No. 5).

In FIGS. 8 and 9, decoded data is stored in frame buffers 1-3 and 1-4, respectively, and each of the connections of valid and vacant chains is modified.

In FIG. 10, the decoded data stored in frame buffer 3 in FIG. 9 is deleted and frame buffer 3 is released. Therefore, a valid chain connects frame buffers 1, 2 and 4, while a vacant chain connects frame buffers 5-*m* and 3. At this moment, frame buffer 5 in which data is to be stored after frame buffer 4 in the original decoded data storage order in the initial status is a frame buffer at the top of a vacant chain, and released frame buffer 3 is located at the end of the vacant chain. Assuming such a status, the preferred embodiment is described herein after.

As described above with reference to FIGS. 5-10, every time decoded data is stored in a frame buffer or deleted from it, valid and vacant chains are updated. Before describing the flowcharts of these update processes, a data storage format used for that process is described with references to FIGS. 11 and 12. In this description it is assumed that valid and vacant chains connect blocks corresponding to m frame buffers one to one in FIGS. 5-10 and that each block number corresponds to a frame buffer number one to one. It is assumed that in FIGS. 11 and 12, 10 numbers of 0-9 are used.

FIG. 11 shows an example of the storage of common data corresponding to each block in each chain. In this example, the number of blocks connected by a valid chain, the number of blocks connected by a vacant chain and the respective leading block numbers of valid and vacant chains are stored. The initial status where all frame buffers are vacant as shown in FIG. 5, a status where data is registered in frame buffer 0, a status where data is registered in frame buffers 0 and 1, . . . and so on are shown rightward in that order, and the common data in the case where data is stored in all frame buffers is shown at the rightmost end. These data transition will be described later with reference to the flowcharts shown in FIGS. 13 and 14.

FIG. 12 shows an example of the storage of block individual data corresponding to each block in each chain. In this example, PREV and NEXT data is stored in addition to data indicating whether each of blocks #0-#9 is used or unused, specifically, whether decoded data is stored in corresponding buffer memory, frame data and time information about frame data. In this case, PREV indicates a block number corresponding to a frame buffer located before a valid or vacant chain, and NEXT indicates a block number corresponding to a subsequent frame buffer in a chain. The transition of these values will be described later with reference to the flowcharts shown in FIGS. 13 and 14.

By using data shown in FIGS. 11 and 12, the structures of valid and vacant chains can be clarified. For example, in the initial status corresponding to FIG. 5, the number of blocks of a valid chain is "0" and there is no valid chain. The number of blocks of a vacant chain is "10" and all blocks are connected by a vacant chain. Since the leading block number of this vacant chain is "0", and NEXT of block #0 shown in FIG. 12 is "1", a block subsequent to block #0 is #1. Since the NEXT value of block #1 is "2", a subsequent block is #2. In this way, by tracing a NEXT value, the connection status in the forward direction of a vacant chain can be clarified. While by tracing the PREV value of each block, the connection status in the backward direction of the vacant chain can be clarified.

When one frame is registered in FIG. 11, the number of blocks of a valid chain becomes "1" and its leading block number becomes "0". In this case, since NEXT and PREV values of block #0 in FIG. 12 both are "0", it is detected that the valid chain is composed of only block #0.

However, since the number of blocks of a vacant chain is "9" and its leading block number is "1", as to a vacant chain connecting 9 blocks, its connections in the forward and backward directions can be clarified by tracing the NEXT and PREV values, respectively, of each block starting from block #1.

Similarly, when decoded data is stored in all 10 frame buffers, the connection status of the valid chain can be clarified since the number of the blocks of a valid chain and its leading block number are "10" and "0", respectively. Since the number of blocks of a vacant chain is "0", it can be clarified that there is no vacant chain. In this case, although the leading block number of the vacant chain is "9", it simply indicates that the leading block number of a vacant chain in the status where decoded data is stored in 9 frame buffers is not updated and this leading block number is not referenced in the process of the flowchart, which will be described later. Therefore, no problem occurs in a non-updated status.

Figure 13:
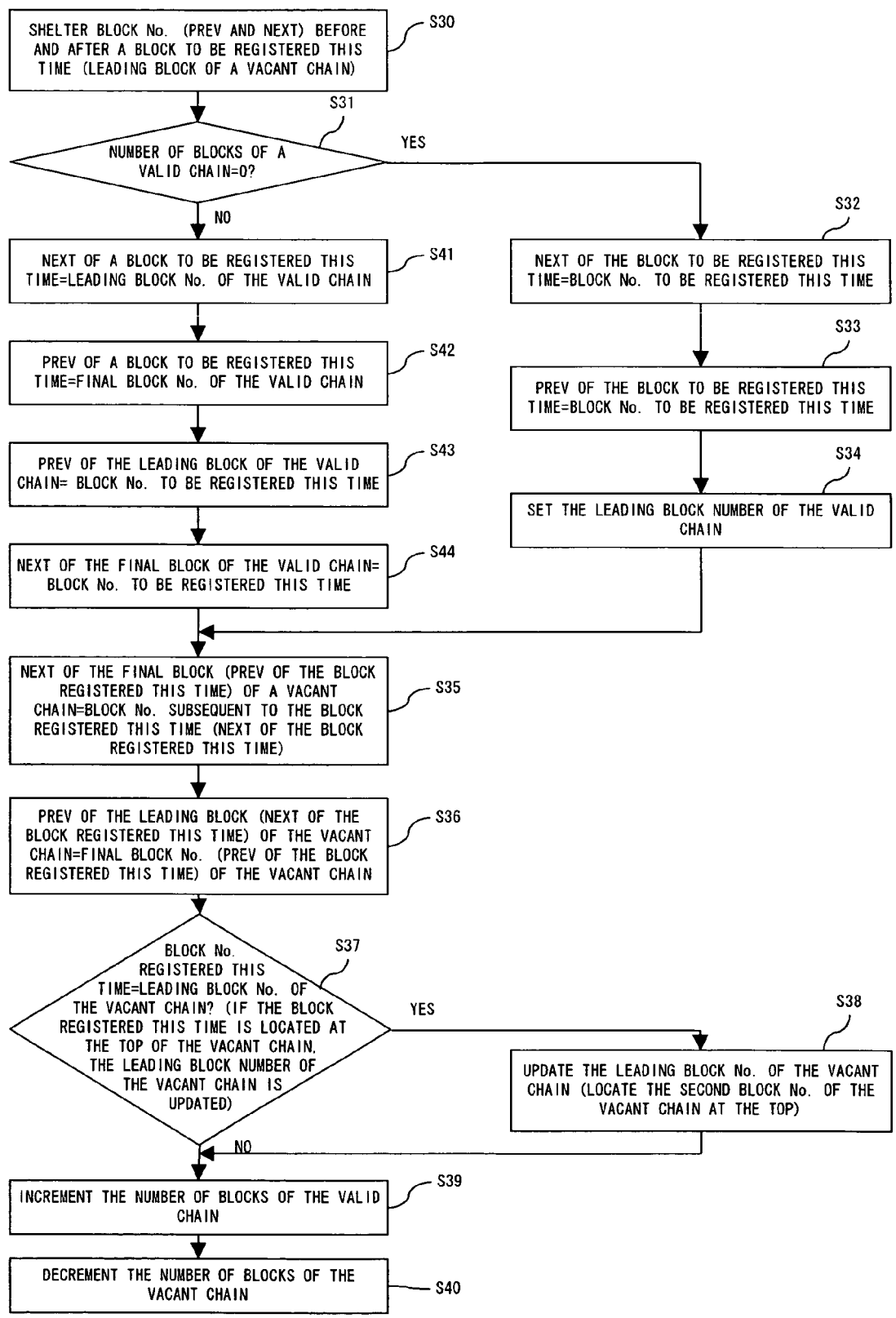
FIG. 13 is a detailed flowchart showing a chain update process at the time of storing data in a frame buffer.

FIG. 13 is a detailed flowchart showing a chain update process at the time of storing data in a frame buffer. A process in FIG. 13 until data is stored in one frame buffer from the initial status where no valid data is stored in any of 10 frame buffers and also a process until one valid data is stored another frame buffer, including the data update shown in FIGS. 11 and 12, are described as examples.

In step S30 of FIG. 13, a block to register this time, that is, the leading block of a vacant chain (in FIG. 11, block numbers before and after a block with block number "0", that is, PREV and NEXT values "9" and "1", respectively, of block #0) is sheltered, specifically is stored in a work area or the like as a value to be used for the process. Then, in step S31 it is determined whether the number of blocks of a valid chain is "0". Since at this moment it is in its initial status and the number of blocks of a valid chain is "0", in step S32 the number of block in which data is registered this time, that is, "0" is becomes the NEXT value of the block in which data is registered, that is, block #0. This is the NEXT value of block #0 in which one frame is registered in FIG. 12.

Then, in step S33, similarly a block number "0" becomes the PREV value in one-frame registration status of block #0. Specifically, in these processes, the value of the right side is assigned to the value of the left side. Then, in step S34, the leading block number of the valid chain is set. In this status, valid data is stored only in a frame buffer corresponding to block #0, and the leading block number of the valid chain remains "0".

Then, in step S35, the number of a block subsequent to the block in which data is registered this time, specifically a NEXT value "1" in the initial status before one-frame registration of block #0 in which data is registered this time is stored as the NEXT of the final block of the vacant chain, that is, a block #9 being a PREV block before one-frame registration of block #0 in which data is registered this time. In step S36, the final block number of the vacant chain, that is, a previous PREV value "9" of block #0 in which data is registered this time is stored as the PREV value of the leading block of the vacant chain, that is, block #1 indicated by a previous NEXT of block #0 in which data is registered this time.

Then, in step S37 it is determined whether a block number "0" registered this time coincides with the leading block number of the vacant chain. In this case, since the leading block number of the vacant chain in the initial status is "0", it is determined that they are matched, and in step S38 the leading block number of the vacant chain is updated. Specifically, the second block number from the top in the initial status of the vacant chain, "1" in this case, is stored as the leading block number of the vacant chain in the one-frame registration shown in FIG. 11.

If in step S37 it is determined that there is no need to update the leading block number of the vacant chain, immediately or after the process in step S38, in step S39 the number of blocks of the valid chain is incremented, and in step S40 the number of blocks of the vacant chain is decremented. Then, the chain update process in the case where data is stored only in a frame buffer corresponding to block #0 after the initial status terminates.

Next, the chain update process from one-frame registration status to two-frame registration status in FIG. 11, that is, in the case where data is stored in a frame buffer corresponding to block #1 is described. Firstly, in step S30, PREV and NEXT values "9" and "2", respectively, corresponding to block #1 are sheltered, in step S31 it is determined that the number of valid chain blocks is not "0" and in step S41 the leading block number of the valid chain, that is, "0" becomes a NEXT value at the time of two-frame registration of block #1 in which data is registered this time. In step S42, the final block number of the valid chain, that is, "0" is stored as the PREV value of the block #1 in which data is registered this time. Then, in step S43, the number of a block in which data is registered this time "1" becomes the PREV value of the leading block, that is, #0 of the valid chain, and in step S44, similarly a block number "1" becomes the NEXT value of block #0.

Then, the same process as when the number of blocks of the valid chain is "0" is performed in steps S35 and after. Firstly, in step S35, the number "2" of a block subsequent to a block in which data is registered this time, is stored as the NEXT value of the final block #9 of the vacant chain. In step S36, the final block number "9" of the vacant chain is stored as the PREV value of the leading block #2 of the vacant chain, and in step S37 it is determined whether the leading block number of the vacant chain must be updated. In this case, since the block number registered this time and the leading block number of the vacant chain both are "1" and are matched, in step S38 the leading block number of the vacant chain is updated to "2", in step S39 the number of blocks of the valid chain is incremented, in step S40 the number of blocks of the vacant chain is decremented and the process terminates.

Figure 14:
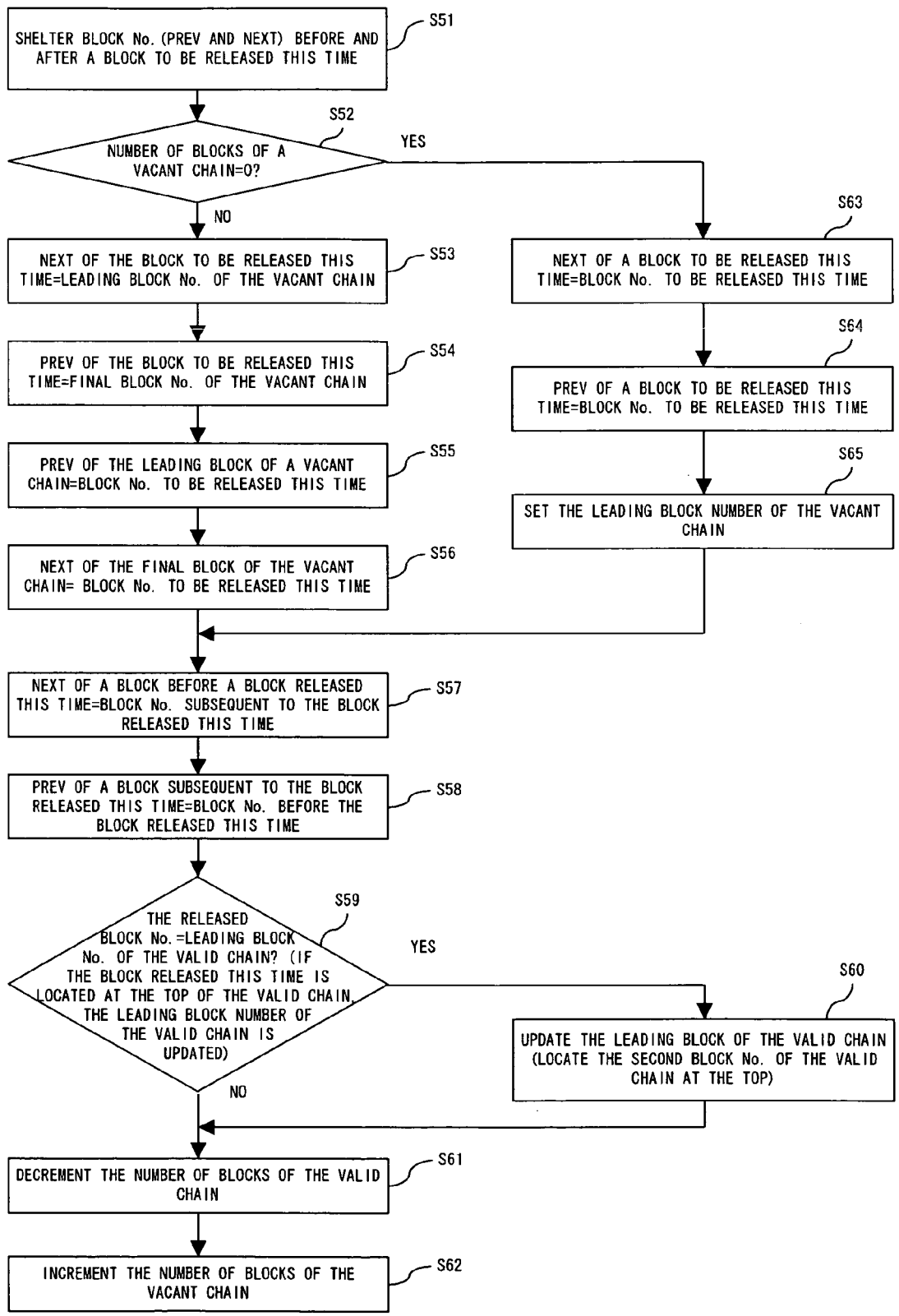
FIG. 14 is a detailed flowchart showing a chain update process at the time of deleting data from a frame buffer.

FIG. 14 is a detailed flowchart showing a chain update process at the time of deleting data from a frame buffer. The process shown in FIG. 14 is described using a case where the data of a frame buffer corresponding to block #1 after nine-frame registration in FIG. 11 is deleted, that is, released, as an example.

Firstly, in step S51, the numbers of blocks before and after a block to be released this time, the PREV and NEXT values "0" and "2", respectively, at the time of nine-frame registration of block #1 in this case, are sheltered and in step S52 it is determined that the number of blocks of the vacant chain is not "0". Then, in step S53 the leading block number "9" of the vacant chain is stored as the NEXT value of block #1 released this time, and in step S54 the final block number "9" of the vacant chain is also stored as the PREV value of block #1.

Then, in step S55 the block number "1" to be released this time is stored in the PREV of the leading block #9 of the vacant chain, and in step S56 a block number "1" is stored in the NEXT of block #9. By the processes in steps S53-S56, the connection of the vacant chain is modified, block #1 is added to the vacant chain composed of only block #9 and the vacant chain is connected.

Then, in step S57 the number, "2" in this case, of a block subsequent to the block released this time is stored as the NEXT value of a block before the block released this time, that is, block #0, in step S58 a block number "0" is stored as the PREV value of block #2 and in step S59 it is determined whether the number of the released block, "1" in this case, coincides with the leading block number of the valid chain. This is because if the released block is located at the top of the valid chain, the leading block number of the valid chain must be updated. If they are matched, in step S60 the leading block number of the valid chain, the number of whose second block is the leading block number is updated and them the process proceeds to step S61. In this case, since the number of the released block is "1" and the leading block number of the valid chain is "0", they are not matched. Therefore, without performing the process in step S60, in step S61 the number of the blocks of the valid chain is decremented and in step S62 the number of the blocks of the vacant chain is incremented. Then, the chain update process of deleting data from a frame buffer corresponding to block #1 terminates.

Next, as another example of the chain update process, the case where a frame buffer corresponding to block #1 is released in the same way as described above after data is stored in all of ten frame buffers is described.

In this case, after in step S51 "0" and "2" are sheltered as PREV and NEXT values in the same way as described above, in step S52 the number of blocks of the vacant chain is determined to be "0" and the process proceeds to step S63.

In step S63 a block number "1" to be released this time is stored as the NEXT value of block #1, and in step S64 the value "1" is stored as the PREV value of block #1. In step S65 the leading block number of the vacant chain is set to "1". Thus, the vacant chain is composed of only block #1.

Then, in steps S57 and S58 the same processes as described above are performed. Thus, block #1 is removed from the valid chain. Then, in step S59 it is determined in the same way as described above that the number of the released block does not coincide with the leading block number of the valid chain, in step S61 the number of the blocks of the valid chain is decremented and in step S62 the number of the blocks of the vacant chain is incremented. Then, the process terminates.

Figure 15:
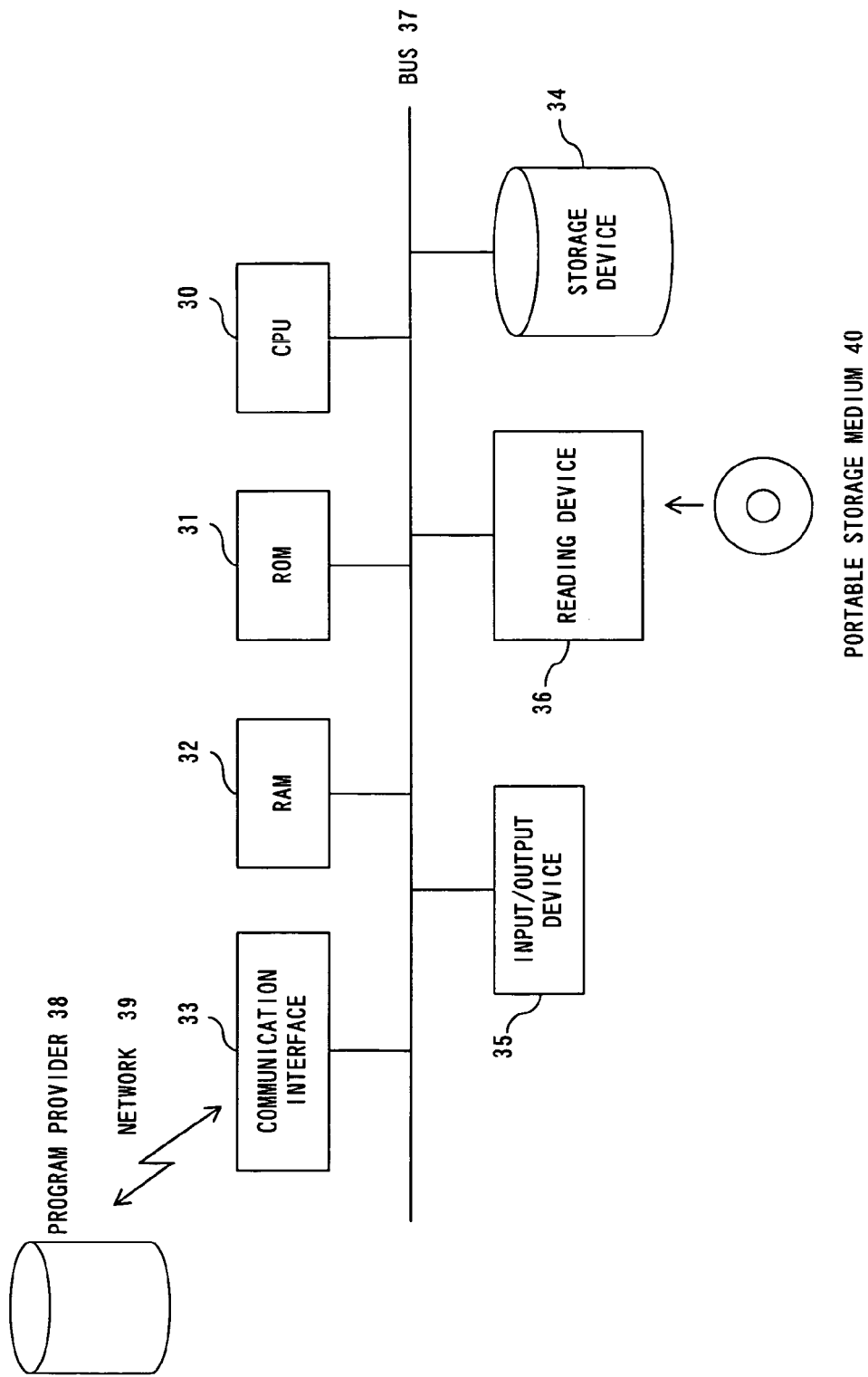
FIG. 15 explains the loading of a program for realizing the present invention onto a computer.

Although the frame buffer management program and its management method of the present invention have been so far described in detail, this program can be used a decoding system based on a general-purpose computer. FIG. 15 shows the configuration of such a computer system, specifically such a hardware environment.

In FIG. 15, a computer system comprises a central processing unit (CPU) 30, read-only memory (ROM) 31, random-access memory (RAM) 32, a communication interface 33, a storage device 34, an input/output device 35, a portable-storage-medium reading device 36 and a bus 37 to which all these devices and units are connected.

For the storage device 34, various types of storage devices, such as a hard disk, a magnetic disk or the like can be used. Such a storage device 34 or ROM 31 stores the programs shown in the flowcharts of FIGS. 4, 13, 14, etc. If the CPU 30 executes such a program, the management of a plurality of frame buffers, the update of valid and vacant chains and the like of the preferred embodiment can be realized.

Such a program can be stored in, for example, the storage device 34 by a program provider 38 via a network 39 and the communication interface 33. Alternatively, it can be stored in a portable storage medium 40 sold and distributed in the market, set in the reading device 36 and executed by the CPU 30. For the portable storage medium 40, various types of storage media, such as CD-ROM, a flexible disk, an optical disk, a magneto-optical disk, a DVD, etc., can be used. If the reading device 36 reads a program stored in such a storage medium, the management of a plurality of frame buffers, the improvement of control speed and the like can be realized.

What is claimed is:

1. A non-transitory computer-readable portable storage medium used by a computer managing a plurality of frame buffers and storing a program enabling the computer to execute a process, the process comprising:
    preparing an area in which data of a valid chain indicating a connection among frame buffers storing valid image data of the plurality of frame buffers and data of a vacant chain indicating a connection among frame buffers storing no valid image data, is stored, on memory; and
    generating/updating data of the valid chain and the vacant chain when valid image data is stored in one of the plurality of frame buffers and storing it in the memory,
    wherein the area in the memory, which stores the data of the valid chain and the data of the vacant chain comprises:
        a chain leading block number storage area for storing a first number indicating top of the valid chain and a second number indicating top of the vacant chain, of a block among blocks corresponding to the plurality of frame buffers one to one; and
        a block individual data storage area for storing data indicating whether valid data is stored in a frame buffer corresponding to each of the blocks and numbers of blocks connected before and after the block on the valid chain or the vacant chain, a last block number of the valid chain as a number of a block connected before the top block of the valid chain, and a last block number of the vacant chain as a number of a block connected before the top block of the vacant chain.

2. The non-transitory computer-readable portable storage medium according to claim 1, wherein the image data is moving image data.

3. The non-transitory computer-readable portable storage medium according to claim 1, the process further comprising:
    releasing a frame buffer storing image data when the image data stored in any of the plurality of frame buffers becomes unnecessary; and
    updating the data of the valid chain and vacant chain and storing it in the memory.

4. The non-transitory computer-readable portable storage medium according to claim 3,
    wherein the image data is moving image data, and
    wherein the process further comprises determining that data of a frame buffer storing the oldest image data of the plurality of frame buffers is unnecessary when valid image data is stored in almost all of the plurality of frame buffers and releasing the frame buffer.

5. The non-transitory computer-readable portable storage medium according to claim 1, wherein the program is used to manage a frame buffer storing relayed image data obtained by decoding the compress/encoded moving image data.

6. The non-transitory computer-readable portable storage medium according to claim 1, wherein
    the valid chain can be composed by tracing number of a block storing valid data in a corresponding frame buffer, of blocks stored in the block individual data storage area, starting from a valid chain leading block number in the chain leading block number storage area and
    the vacant chain can be composed by tracing number of a block storing no valid data in a corresponding frame buffer, of blocks stored in the block individual data storage area, starting from a vacant chain leading block number in the chain leading block number storage area.

7. A frame buffer management method which manages a plurality of frame buffers, comprising:
    preparing an area in which data of a valid chain indicating a connection among frame buffers storing valid image data of the plurality of frame buffers and data of a vacant chain indicating a connection among frame buffers storing no valid image data, is stored, on memory; and
    generating/updating data of the valid chain and the vacant chain when valid image data is stored in one of the plurality of frame buffers and storing it in the memory,
    wherein the area in the memory, which stores the data of the valid chain and the data of the vacant chain comprises:
        a chain leading block number storage area for storing a first number indicating top of the valid chain and a second number indicating top of the vacant chain, of a block among blocks corresponding to the plurality of frame buffers one to one; and
        a block individual data storage area for storing data indicating whether valid data is stored in a frame buffer corresponding to each of the blocks and numbers of blocks connected before and after the block on the valid chain or the vacant chain, a last block number of the valid chain as a number of a block connected before the top block of the valid chain, and a last block number of the vacant chain as a number of a block connected before the top block of the vacant chain.

* * * * *